APPARATUS FOR FEATURE RECOGNITION OF SYMBOLS
Filed Oct. 14, 1963 4 Sheets-Sheet 1
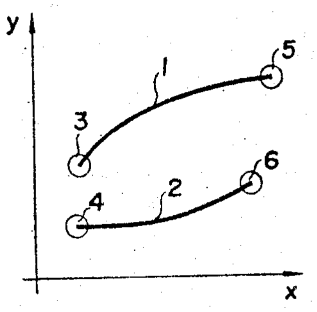
FIG. 1 (I)
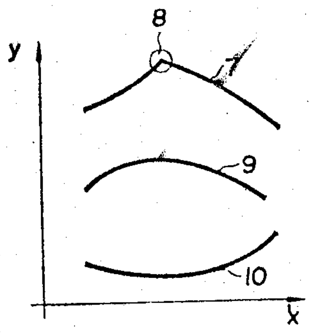
FIG. 1 (II)
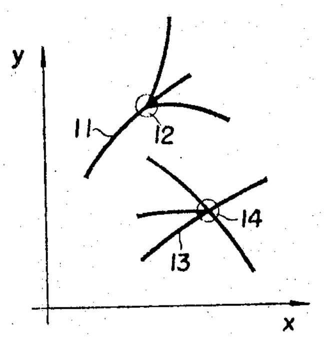
FIG. 1 (III)
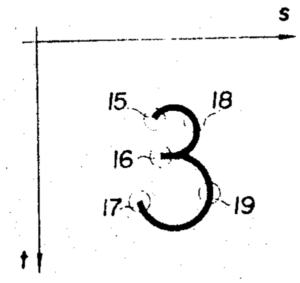
FIG. 2 (I)
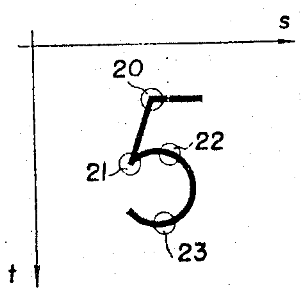
FIG. 2 (II)
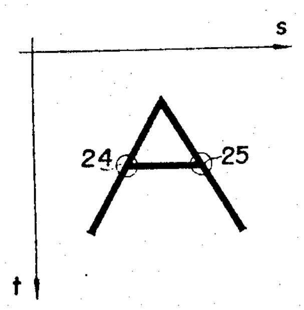
FIG. 2 (III)
Moritada Kubo
Sadakazu Watanabe
INVENTORS
BY George B. Oujevolk
Attorney Aug. 23, 1966 MORITADA KUBO ET AL 3,268,864
APPARATUS FOR FEATURE RECOGNITION OF SYMBOLS
Filed Oct. 14, 1963 4 Sheets-Sheet 2
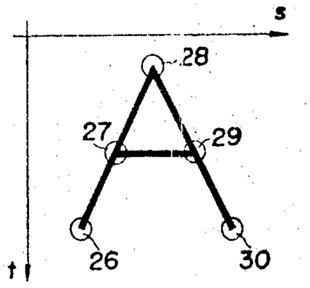
FIG. 3 (I)
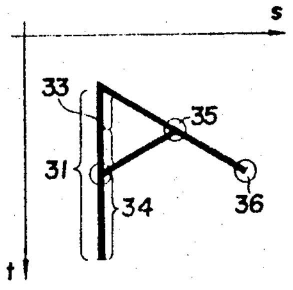
FIG. 3 (II)
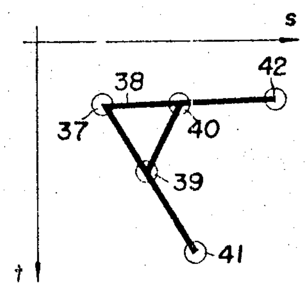
FIG. 3 (III)
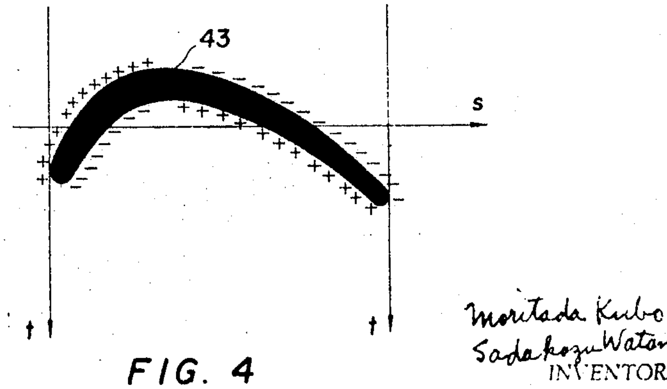
FIG. 4
Moritada Kubo
Sadakazu Watanabe
INVENTORS
BY George B. Oujevolk
Attorney

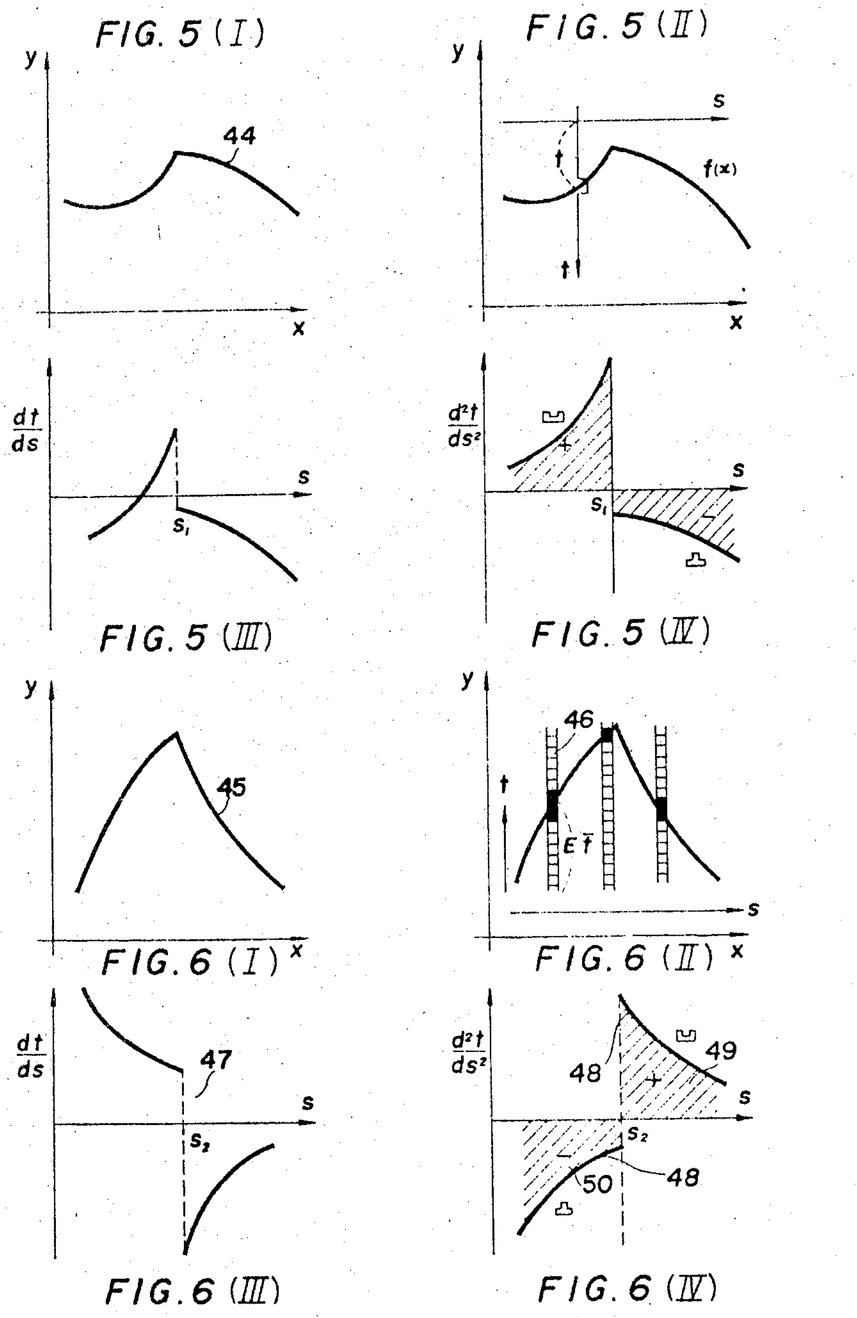
FIG. 5 (I), FIG. 5 (II), FIG. 5 (III), FIG. 5 (IV), FIG. 6 (I), FIG. 6 (II), FIG. 6 (III), FIG. 6 (IV)
INVENTORS
Moritada Kubo
Sadakazu Watanabe
BY George B. Oujevolk
attorney

APPARATUS FOR FEATURE RECOGNITION OF SYMBOLS

Filed Oct. 14, 1963 4 Sheets-Sheet 4

INVENTORS
Moritada Kubo
Sadakazu Watanabe

BY

George B. Oujevolk
ATTORNEY

3,268,864
APPARATUS FOR FEATURE RECOGNITION OF SYMBOLS

Moritada Kubo and Sadakazu Watanabe, Tokyo, Japan, assignors to Tokyo Shibaura Electric Co., Ltd., Kawasaki-shi, Japan, a corporation of Japan Filed Oct. 14, 1963, Ser. No. 315,994
Claims priority, application Japan, Mar. 18, 1963, 38/12,673
2 Claims. (Cl. 340—146.3)

Figure 7:
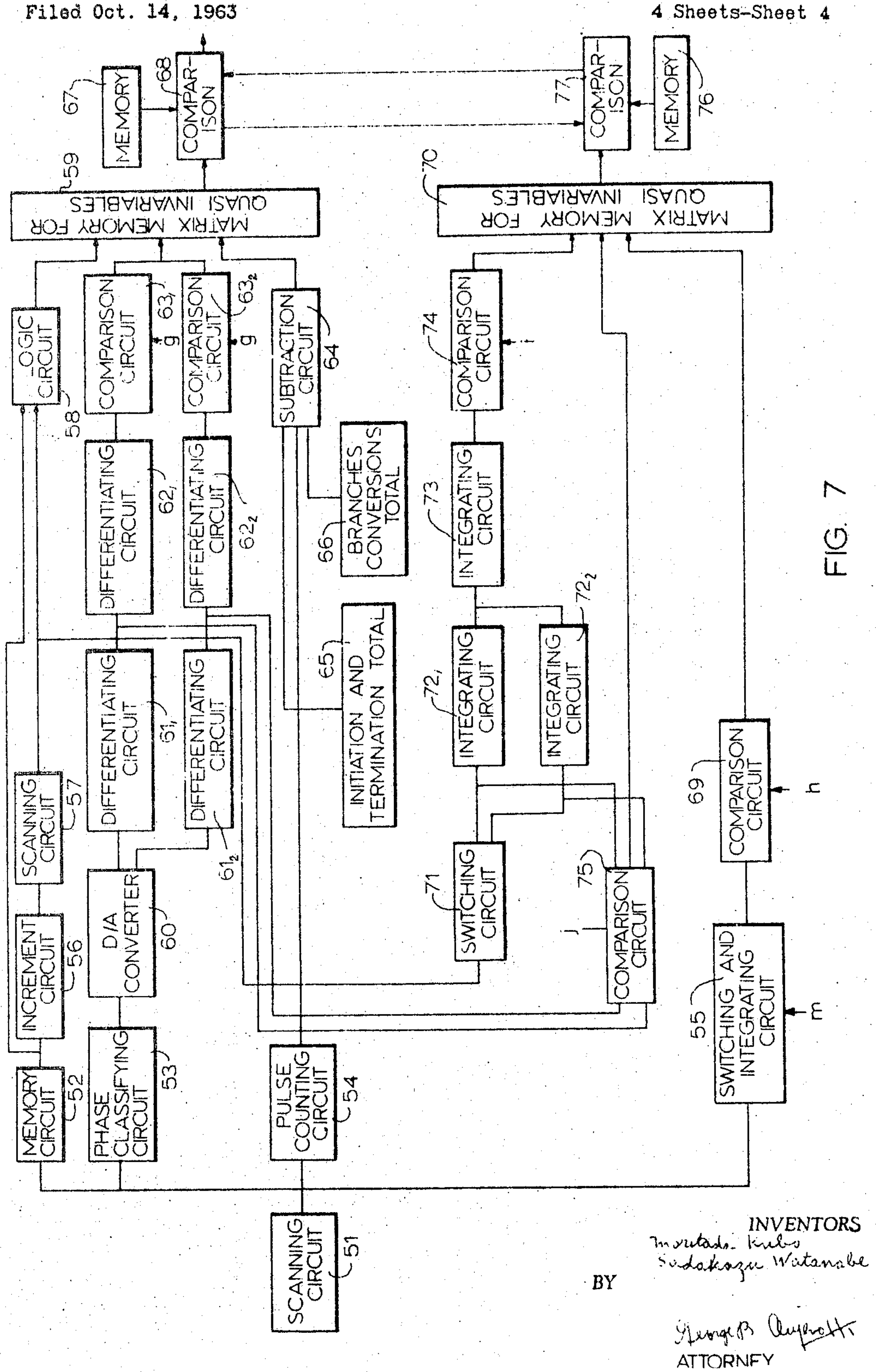

This invention relates to a figure recognizing system and more particularly to a system to automatically read out figures by determining geometrical characteristics inherent to such figures as letters, numerals, symbols and the like and by determining quantitative characteristics of their intended applications.

In many countries extensive researches are being made to develop improved apparatus adapted to recognize or read out and discriminate letters, numerals, symbols and the like, for instance, an automatic key puncher, an input letter reader for computer, a letter-braille converter for blind people, etc. While certain apparatus can achieve their object by using special printing types, papers with special ruled lines or various other binding conditions, they are generally too sensitive to the dimension, slope, position, ratio between transversal and longitudinal dimensions, hand writing and the like of the figures so that they would produce different results for the same figure, failing to identify figures having the same geometrical characteristics as one group. In other words, prior art apparatus could not identify identical figures by recognizing the common geometrical characteristics inherent to these figures regardless their dimension, slope, position, ratio between transversal and longitudinal dimensions and the like factors.

Accordingly, it is the principal object of this invention to provide a novel figure recognizing system which can automatically read out figures without accompanying the above mentioned defects by detecting the geometrical characteristics inherent to such figures, or quasi-invariables which are independent upon coordinate transformation and further by detecting quantitative characteristics or variable quantities according to the intended application of the figure.

Another object of this invention is to provide a novel system of electrically recognizing and reading out figures written on a sheet of paper and other printed matters.

Still another object of this invention is to provide an improved figure recognizing system which can automatically recognize figures irrespective to their dimension, slope, position, and the ratio between longitudinal and transversal dimensions.

A further object of this invention is to provide a letter read out system which can correctly read out letters without an error.

While the specification concludes with claims particularly pointing out and distinctly claiming the subject matter which are regarded as this invention, it is believed that the invention will be better understood from the following description taken in connection with the accompanying drawings, in which:

FIG. 1(I), FIG. 1(II), FIG. 1(III) shows plots for explaining quasi-invariables;

FIG. 2(I), FIG. 2(II), FIG. 2(III) illustrates examples of quasi-invariables;

FIG. 3(I), FIG. 3(II), FIG. 3(III) shows the sequence of occurrence of the three elements *a*, *b* and *c* of quasi-invariables;

FIG. 4 shows a plot for explaining the detection of initiation and termination according to this invention;

FIG. 5(I), FIG. 5(II), FIG. 5(III) FIG. 5(IV) shows plots for explaining the detection of bow and bent according to this invention;

FIG. 6(I), FIG. 6(II), FIG. 6(III), FIG. 6(IV) shows the method of detecting variable quantity in accordance with this invention; and FIG. 7 is a schematic block diagram of one embodiment of this invention.

It is believed helpful in understanding the invention to consider at first the geometrical characteristics of figures, that is the invariables which are inherent to figures without relying upon coordinate transformation.

More particularly, the geometrical characteristics which are inherent to figures do not change generally by coordinate transformation. In other words a figure corresponds to a group of invariables in the relation of one to one correspondence. Thus, for example, a triangle is always a triangle irrespective how it is large, small, inclined or positioned in a corner or at the center of the field of view. In determining such an invariable, even when the figure is an invariable with respect to the coordinates fixed to the figure, when the figure is measured by using coordinates accompanying to the measuring device the result would not be a complete invariable but instead a quasi-invariable. This is because there is generally no fixed relation between the coordinates fixed to the figure and the coordinates fixed to the identifying device.

In carrying the present invention into practice, use is made of what is herein termed "quasi-invariables." By this expression is meant certain features which occur in symbols of communication and which features can be identified by means known in the art. These features consist of the following three elements:

(a) Initiation and termination, i.e., the start and finish of a line, segment, or symbol, (b) Bow and bend, i.e., convex and concave curves, (c) Branching or divergence and converging, i.e., a plurality of lines, curves, or segments separated from each other but meeting at a common point or starting from a common point then separating.

Other features which occur in symbols of communication such as relative magnitude, inclination of line elements, relative distribution of elements, are called "variables."

FIG. 1 serves to explain said three elements of the quasi-invariables using rectangular coordinates. In FIG. 1(I), portions 3 and 4 of curves 1 and 2 are designated as the initiation, portions 5 and 6 as the termination, while in FIG. 1(II) the portion 8 of the curve 7 is designated as the discontinuation and the curves 9 and 10 as the convex (negative curvature) and the concave (positive curvature), respectively. In FIG. 1(III) the portion 12 of the curve 11 is designated as the branching and the portion of the curve 13 as the convergence.

In FIG. 2 are illustrated some examples of the quasi-invariables *a*, *b* and *c*. Portions 15, 16 and 17 of the numeral 3 shown in FIG. 2(I) correspond respectively to initiations while portions 18 and 19 to terminations. Portions 20 and 21 of the numeral 5 shown in FIG. 2(II) correspond to discontinuations (bent) and branching respectively, a portion 22 to convex (negative curvature) and a portion 23 to concave (position curvature). In FIG. 2(III) a portion 24 of a letter A represents the branching while a portion 25 the convergence.

FIG. 3 serves to explain the sequence of occurrence of the three elements *a*, *b* and *c* of the quasi-invariables. When the letter A is scanned in the direction of *t* which is perpendicular to the direction *s* that is predetermined direction, said elements occur in the sequence of the initiation 26, branching 27, bent 28, convergence 29 and termination 30. On the other hand, in the case of an inclined letter A containing line elements which are parallel to the direction of scanning, as shown in FIG. 3(II), said three elements will occur in the sequence of the initiation 31, branching 33, a pair of termination and branching 34, convergence 35 and termination 36. Further, in the case of another inclined letter A as shown in FIG. 3(III), said three elements will occur in the sequence of the initiation 37, branching 38, branching 39, convergence 40, termination 41 and termination 42. It will be understood that the configuration of the respective figures could be determined by detecting the manner in which the three elements of the quasi-invariables occur sequentially in each of the figures and by handling them as the quasi-invariables. Generally the geometrical characteristics of figures are precisely determined by constraints which are employed to describe the movement of such writing instruments as a pencil, pen and the like. For example, under particular constraints that the writing instrument moves along a locus of equal distance from one point, the resulted figure would be always a circle irrespective to the position of said point, the magnitude of said distance. Thus by knowing the change in the magnitude of motion of the writing instrument as well as the magnitude of the angular motion and the sequence of their occurrence, the figure written can be determined. However such a method of determination is generally difficult to practice because, in directly carrying out such a method, it is required to use a figure identifying apparatus which can follow line elements that constitute the figure. Thus, it is advantageous to consider the sequence of occurrence of said three elements *a*, *b* and *c* as the intelligence quantities which are equivalent to them in order to determine the figure.

Variable quantities (quantitative characteristic) according to the intended application will now be considered.

Generally these variable quantities can be classified into the following three groups.

(*x*) Relative magnitude of the figure with respect to the field of view and resolution, (*y*) Extent of the inclination of line elements constituting the figure, and (*z*) Relative distribution of the length, boldface and position of the line elements constituting the figure.

The quantitative characteristic of the groups *x*, *y* and *z* are not the essential one of the geometrical characteristics of the figure but may be required for particular intended use. Thus, it may be said that said variable quantities are the intelligence quantities which should be detected in order to known for what kind of meaning the figure to be identified is intended to be used.

For example, (—) (dash) and (-) (hyphen) can be considered geometrically as the same figure (line element) but they are discriminated as a numeral and a hyphen depending upon the magnitude of length (*x*). Symbols (|), (/) and (—) are used in different applications according to their inclination. Similarly symbols I and I having the same geometrical configuration are used as a numeral and an alphabet, respectively, owing to the difference between boldface of their horizontal sections and that of their vertical sections. It will be clear from the above described examples that the geometrical characteristics which are inherent to the figure and detected by using the quasi-invariables of coordinate transformation are not sufficient to know the intended use of the figures so that the variable quantities should also be detected.

As a method of detecting the above mentioned elements *a*, *b* and *c* of the quasi-invariables and the elements *x*, *y* and *z* of the variable quantities may be employed usually a scanning system which is used in facsimile transmission and television image tube to obtain time varying informations, incremental scanning system which is used in punched card readers and tape readers to obtain parallel intelligence columns or a peripheral incremental system which is used in theater billboards to simultaneously detect all points whereby two dimensional distribution of the intelligence may be obtained.

At first, a method of detecting quasi-invariables *a*, *b* and *c* will be considered in detail.

(*a*) *Method of detecting initiation and termination.*—In order to detect the presence of the line elements comprising a figure, any one of various known methods may be used. Thus, in one case, an optical method is used to detect the difference in the light reflection between the figure and its surroundings, while in the other case, an electrical method is used to detect the difference in the electrical conductivity between the figure and its surroundings.

When the opposite ends of the line elements constituting the figure are deemed as the initiation and termination, it is possible to detect them by utilizing a system which acts to eliminate the boldface of the line element. Thus, a pair of crossing points between a scanning line and the contour may be considered as a single line.

FIG. 4 is shown to explain the detection of the initiation and termination by utilizing a scanning system. It is assumed that the contour of a line element 43 is generally a closed curve and any desired direction *s* is selected which is then considered as the rectangular coordinates of the detecting device together with an axis *t* which is perpendicular to *s*. Generally, a straight line drawn in the direction of *s* will cross even times the contour excepting the case where such a line consistitutes a tangent. Accordingly two crossing points are paired and two crossing points in each pair are discriminated according to the direction *s*. Similarly, a straight line in the direction of *t* which is normal to the direction *s* will cross even times the contour of the line element. For example, in sequentially scanning the line element 43 in the direction of *s*, when it is assumed that the portion [o,+] in which signals were increased be designated as (+), that the portion [+,o] in which signals were decreased as (—), and that the portion [+ . . . +] in which the scanning line and the contour overlapped be (◎), then the whole portions of the contour can be classified into three portions (+), (—) and (◎). Thus, the straight line in the direction of *t* cross the contour at either one of its portions of (+), (—) or (◎) and the possible types of cross pairs will be (+,+), (+,—), (—,+), (—,—), etc. Where the scanning line in the direction of *t* overlaps upon the contours, the type of the cross will be (+ . . . +) or (— . . . —). The types (+,+) and (+ . . . +) may be handled as the initiations based on the direction *s*, while (—,—) and (— . . . —) as the terminations. However, in order to identify the initiation and termination, the presence of the line elements must be detected simultaneously.

(*b*) *Method of detecting bow and bent.*—Where the types of the figure to be identified are limited, for instance, only numerals are involved, as will be obvious from FIG. 4, the transition from (+,—) to (—,+) represents the apex or point of bending of a convex curve. But where it is necessary to discriminate between sharp bent and bow (for example V and U) such a method of detection is insufficient so that twice differentiating operations are necessary. The configuration of the line element is represented by the coordinates (*t*,*s*) of the detecting device, the value of $$\frac{d^2f(s)}{ds^2} \text{ or } \frac{\Delta^2 f(s)}{\Delta s^2}$$

is calculated by denoting $t=f(s)$ and then the configuration is determined as concave, convex or bent dependent upon whether the calculated value is plus, minus or $\pm\infty$.

FIG. 5 serves to explain a method of detecting bow and bent by means of a scanning system now widely used in facsimile transmissions, televisions and the like. Let us consider a figure 44 which is represented by a function $f(x)$ using rectangular coordinates *x* and *y*, shown in FIG. 5(I). FIG. 5(II) serves to explain detection of the phase of the function $f(x)$, in which the direction $s$ is firstly selected, scanning is effected in the direction $t$ which is perpendicular to $s$, and the phase $(t)$ of a point at which a signal corresponding to the crossing point between each scanning line and the line elements is produced is detected to determine the phase of the figure. FIG. 5(III), in which the abscissa represents $s$ and the ordinate represents $dt/ds$, shows that a point of discontinuation $s_1$, can be detected by differentiating the function $t=f(s)$. Further FIG. 5(IV), in which the abscissa represents $s$ while the ordinate represents $d^2t/ds^2$, shows that when the differential coefficient obtained by twice differentiating the function $t=f(s)$ is plus, then the curve is identified as concave, while said differential coefficient is minus then the curve is identified as convex.

(*c*) *Method of detecting branching and convergence.*—Due to rotation of the coordinates, namely inclination of the figure there will be two times where (*b*): bow and bent are equivalently converted into (*c*): branching and convergence. In this case detection of the figure having conditions between (*b*) and (*c*) can be effected by simultaneously using the methods (*a*) and (*c*). Rotation of the coordinates will also result in one case where branching and convergence are mutually exchanged. Thus, due to the relative position of the detecting device with respect to the coordinate axis of the figure the same figure may have groups of limited number of quasi-invariables, but either of (*b*) or (*c*) is always detected. However in practice, since the amount of rotation of the coordinate is small, there is little difficulty.

A condition wherein more than two line elements are present in spaced apart relation and a condition wherein they have one common point can be distinguished by the method of (*a*). However, where it is necessary to discriminate a condition wherein the line elements have one common point from a condition wherein they have a common line element which is in the direction of $t$, in the vicinity near line elements existence of line elements is searched in the direction of $t$. If they have common point, then the presence of other elements will at once be detected which discriminates the condition from that wherein the line elements have common line element lying in the direction of $t$.

The methods of detection for quantitative characteristics of their intended applications will be described in detail hereinbelow.

Like the method of detecting the quasi-invariables aforementioned, variable quantities can be detected by utilizing any one of the following three systems, viz. scanning system utilized in televisions, facsimile transmissions, etc., incremental scanning system utilized in punched card reader, tape reader, etc., and peripheral incremental system utilized in cinesign and the like.

(*x*) *Method of detecting the relative magnitude of the figure with respect to the field of view and resolution.*—Since detecting devices have limited dimensions they can not detect figures larger than a certain limit or too small figures. Too large figures can be at once determined owing to their lack of (*a*): commencement or termination. On the other hand too small figures are deemed to be dark points because they are detected but their construction is not detected. Assuming constant range of detection of the device, the method of (*x*) can generally be attained except such extroardinary cases as above mentioned. Thus, the method of (*x*) can be easily carried out by determining the integrated value of the scanned signals or calculated numbers thereof at the detecting terminals.

(*y*) *Method of detecting the degree of inclination of line elements constituting the figure.*—The general trend of inclination will be clear from the method described above in connection with the detection of (*a*). For instance, scanning direction $t$ is determined by (+, +), (+ . . . +), (−, −) or (− . . . −), upward and downward inclinations by (+, −) and (−, +) while horizontal line by (◎, ◎). Usually, however, as the figures have complicated configurations comprising assemblies of a number of line elements, in order to individually detect the inclination of each line element, the detection should be switched at each time when the element of said invariables occurs and switched by discriminating the phase on the scanning line or the order of the positions at the detecting terminal. Where it is required to detect precise quantity of (*y*) in order to effect fine distinguishment among the inclinations of varying degrees which correspond to intended applications, the value of $dt/ds$ which has been determined in the course of detecting (*b*) is utilized to easily and accurately determine the quantity of (*y*).

(*z*) *Method of detecting relative distribution of the length boldface and position of line elements constituting figures.*—In identifying actual figures, as already pointed out, there are various problems which are different from geometrical characteristics for determining relative distribution of the length mentioned method of (*x*) is separately used for each occasion of the element of each invariable. By this means the length of each line element is independently measured. In order to measure the length alone by ignoring its boldface, the above mentioned method of detecting (*a*) can be advantageously used. Where the boldface can be used as the detected quantity necessary to determine the intended use of the figure, the total area of the line element is measured by the method (*x*) and the result is compared with the length of the line element as measured by the method of (*a*).

The relative distribution of positions, for example, a problem existing in characters O and C can be determined by measuring the spacing between elements by using the above mentioned method (*a*) as the distance between points of occurrence of elements of invariables and then comparing the result with the result obtained by the method (*x*).

In the following, detection of quasi-invariables (*a*), (*b*), (*c*) and (*x*), (*y*) and ($\bar{z}$) by a scanning system utilized in actual televisions, facsimile transmissions and the like will be described.

Assuming now that a scanning line of the direction $t$ is moved in the direction $s$, the value of $\Delta f/\Delta s$ can be determined either by obtaining the value of increment $\Delta f$ in the direction $s$ by using a memory device, or by scanning in the direction of $t$ with two detecting terminals arranged in parallel in the direction of $s$ or by using two image pick-up tubes to detect the images spaced by a distance $\Delta s$. These will produce pulses of + and − as explained in connection with (*a*). (*y*) and (*b*) can be detected by detecting the phase of a cross point between the scanning line in the direction of $t$ and the line element by obtaining the values of $dt/ds$ and $d^2t/ds^2$ with differentiating circuits. (*c*) can be detected by inspecting the distribution of + and − pulses of (*a*) which are stored in a memory device, for instance, by knowing whether the number of − pulses in the course of changing from (+, −) to (−, +) is larger or smaller than the number established by the scale of the device, the value of (*x*) can be easily determined by integrating the output of the scanning line. Since (*z*) is a modification of (*x*) it is only necessary to make some operations before integration. Thus, for example, for eliminating the boldface of the line element, it is only necessary to consider that a line element is composed of a pair of (+, −) pulses and then eliminating the spacing (boldface) between occurrences of + and − pulses.

FIG. 6 shows a set of graphs to explain the method of detecting variable quantities by means of an incremental scanning system. At first a figure 45 given by a function $f(x)$ represented by rectangular coordinates $x$ and $y$, as shown in FIG. 6(I), will be analysed. FIG. 6(II) shows a method of detecting the amount of $(y)$ wherein the direction $s$ is predetermined, columns of detectors 46 are set in the direction of $t$ which is perpendicular to the direction of $s$, and these columns 46 of the detectors are scanned in the direction of $s$ to obtain the position of the detector $(\bar{t})$. Turning now to a graph shown in FIG. 6(III) plotted on coordinates of $s$ against $d\bar{t}/ds$, the point of discontinuation $s_2$ can be detected from a curve 47 which is obtained by differentiating a function $\bar{f}=f(s)$. In FIG. 6(IV) is shown a curve 48 which is obtained by twice differentiating the function $\bar{t}=t(s)$ wherein the abscissa indicates $s$ while the ordinate $d^2\bar{t}/ds^2$. From this figure it will be easily understood that when the value of the second order differential is + the graph is concave as indicated by 49 whereas when such value is — the graph is convex, as indicated by 50.

Differential coefficient $\Delta f/\Delta t$ with respect to the direction $t$ in the case of the incremental scanning system can be obtained by knowing the difference $\Delta f$ in the output $f$ between adjacent detectors. Similarly, by using two detector columns to derive $\Delta f/\Delta s$ from between them adjacent in the direction $s$ detecting terminals, or $\Delta f/\Delta s$ can be provided by means of a memory device. Detection of $(y)$ and $(b)$ can be effected by knowing the position $(\bar{t})$ of the detector and that of $(x)$ can be effected by detecting only detecting terminals which are detecting to the figure and integrating the number thereof.

Although not shown in the drawings, in the case of a circumferential incremental system the required differential coefficient can be obtained from the difference in the outputs between all adjacent detectors. The differential coefficients of the first and second orders $dt/ds$ and $d^2t/ds^2$ can be obtained as $\Delta t/\Delta s$ and $\Delta^2t/\Delta s^2$ by knowing the output which is proportional to the position of the detecting terminals integrals thereof can be obtained by counting the total number of the detectors which are superposed upon the figure. Thus, the sequence of occurrence of the elements of the quasi-invariables and the value of the variable quantities can be easily obtained by combining a proper detecting method, the memory devices and the differentiating operations.

FIG. 7 shows a block diagram illustrating one embodiment of this invention. In this figure a scanning circuit 51 is connected to a memory circuit 52, a phase classifying circuit 53, a pulse counting circuit 54 and a switching and integrating circuit 55 which is supplied with a switching signal $m$. The output from the memory circuit 52 is supplied to an increment circuit 56 which is connected to a scanning circuit 57. The outputs from said scanning circuit 57 and said memory circuit 52 are supplied to a logical circuit 58 to detect initiation and termination to store them in a matrix memory device 59 for quasi-invariables. The output from said phase classifying circuit 53 is connected to a digital-analogue convertor 60 which is connected to differentiating circuits $\mathbf{61_1}$, $\mathbf{61_2}$ . . . . The outputs from these differentiating circuits are introduced into comparison circuits $\mathbf{63_1}$ and $\mathbf{63_2}$ through another differentiating circuits $\mathbf{62_1}$ and $\mathbf{62_2}$ . . . , respectively. As shown by arrows, predetermined set values $g$ are applied to each of said comparison circuits $\mathbf{63_1}$, $\mathbf{63_2}$ . . . , the outputs thereof are supplied to said matrix memory device 59. The output from said pulse counting circuit 54 is introduced into a substraction circuit 64 which is also supplied with the outputs from a totalizing counting circuit 65 for the numbers of initiation and termination and from a totalizing counter circuit 66 for branchings and convergences. The output from said substraction circuit 64 is supplied to said matrix memory device 59. Outputs from said matrix memory device 59 and a setting memory device of the same type 67 which has been set before hand are connected to a comparison circuit 68. The output from said switching and integrating circuit 55 and a reference value $h$ determined by the length of corresponding line element from 72 are introduced into a comparison circuit 69 whose output is supplied to a matrix memory circuit 70 for variable quantities. A portion of the output from said scanning circuit 57 is supplied to a switching circuit 71, the output thereof being supplied to integrating circuits $\mathbf{72_1}$, $\mathbf{72_2}$, . . . , which, in turn are connected to an integrating circuit 73. The output from this integrating circuit and appredetermined set value $i$ are introduced into a comparison circuit 74, the output thereof being stored in said memory device, for said variable quantities. Portions of the outputs from said differentiating circuits $\mathbf{61_1}$, $\mathbf{61_2}$, . . . are respectively supplied to a comparison circuit 75 together with a predetermined set value $(j)$. The output frim this comparison circuit 75 is supplied to said integrating circuits $\mathbf{72_1}$, $\mathbf{72_2}$, . . . and said matrix memory device 70 for said variable quantities. The outputs from this matrix memory device 70 and a setting memory device of the same type 76 and which has been set beforehand are supplied to a comparison circuit 77 together with the output from said comparison circuit 68. The output from the comparison circuit 77 is fed back to the comparison circuit 68.

The operation of the system of this invention is as follows:

The output pulses obtained by scanning any figure by means of the scanning circuit 51 and the position thereof are supplied to the memory circuit 52, and the output thereof is differentiated by the increment circuit 56. Differentiated signals are then made to correspond to codes ◎, + and —. The values of the codes ◎, + and — are scanned with scanning circuit 57 in the direction of $t$ to obtain sets of codes (+,+), (—,—), (◎,◎), (+,—) or (—,+) and the like. Among these, only the sets of codes (+,+), (+ . . . +) and (—,—), (— . . . —) are caused to be detected by the logical circuit 58 to be stored in the matrix memory device 59 for the quasi-invariables. As indicated by FIG. 7, the logical circuit 58 utilizes also the output from the memory circuit 52.

Said output pulses of 51 are then classified by the phase classifying circuit 53, and each of the classified signals are converted into analogue voltages through the action of the digital-analogue converter 60. After being subjected twice times the differentiating operations by differentiating circuits $\mathbf{61_1}$, $\mathbf{61_2}$, . . . , and $\mathbf{62_1}$, $\mathbf{62_2}$, . . . , these analogue voltages are supplied to comparison circuits $\mathbf{63_1}$, $\mathbf{63_2}$, . . . to be compared therein with the preset value $g$. These comparison circuits function to determine whether the differential coefficient of the second order $d^2t/ds^2$ is positive, negative, zero, plus infinity or minus infinity to detect the presence or absence of concave, convex and bent and to discriminate them from each other. Their informations are supplied to said matrix memory device 59 for the quasi-invariable.

Then the total number of pulses (N) obtained by the scanning of $m$th time of the scanning circuit 51 is counted by the counting circuit 54. On the other hand the integrated number (M) of initiations and terminations until $(m-l)$th scanning (initiations are represented by positive signals, and terminations by negative signals) and the integrated number (P) of branchings and convergences (where branchings are represented by positive signals while convergences by negative signals) are respectively counted by the counting circuits 65 and 66 to subtract the integrated numbers (M) and (P) from the total number of the output pulses (N) by the action of the subtraction circuit 64. It is determined that when the result (N–M–P) is positive the figure contains branchings whereas when the result is negative the figure contains convergences and informations of these results are stored in said matrix memory device 59 for the quasi-invariables. Said output pulses of 51 are then integrated by the action of the switching and integrating circuit 55 to obtain each area of line element. The output from the switching and integrating circuit 55 is supplied to the comparison circuit 69 to be compared therein by the reference value $h$ which are determined by the length of corresponding line element thereby to detect relative magnitude (boldface) of the figure so as to store its information in the matrix memory device 70 for the variable quantities. The outputs from the differentiating circuits $\mathbf{61}_1$, $\mathbf{62}_2$ . . . . are supplied to the comparison circuit 75 to be compared therein with a predetermined set value (*j*) to detect the degree of inclination thereby to supply an information thereof to the matrix memory device 70 for said variable quantities. A portion of the output from the scanning circuit 57 is applied to the switching circuit 71 to be switched the measurement at each time when the quasi-invariable occurs, thus separating the constitutional line elements. Then the set of pulses (+,+), (−,−), (+,−) or (−,+), etc. is counted as one count, these counts are integrated with respect to the *i*th line element and the length $l_i$ of the *i*th line element is obtained by utilizing the result of integration together with $dt/ds$ which has been obtained at the time of detecting the inclination. Such measurements are carried out for each line element so as to detect the whole length $L=\Sigma^n_{j=1}l_i$ by the action of the integrating circuit 73. Values of $L/S_0$ and $L/S_1$ are obtained by using the resolution $S_0$ and the field of view $S_1$ which are inherent to the device. These values are compared with the set value (*i*) by means of the comparison circuit 74 so as to cause the recognizing system to recognize when $L/S_0 \geqq R$ and $L/S_1 < R$ but not recognize when $$L/S_0 \leqq \frac{S_1}{R} \text{ or } L/S_1 \geqq R$$

The resulting informations are stored in the matrix memory device 70 for said variable quantities.

Each of the quasi-invariables (*a*), (*b*), (*c*) and variable quantities (*x*), (*y*), (*z*) obtained as above described are compared with the predetermined output of setting memory devices of the same type to effect identification of figures containing intended use.

In the following, comparison is made between this invention and a supposed system wherein the field of view is generally divided into a great many number of mesh like points and all of these points are utilized as the detectors.

Let us consider the total number of detectors by assuming a square with $10^2$ detectors juxtaposed on one side. In such a case, the number of types of the magnitude of the figures may be about $10^2$ even when it is assumed that they are similar, variations in the ratio between transverse and longitudinal dimensions may also be about $10^2$ for figures practically used, the types of inclinations may be about $10^2$. Therefore, the types of the outputs of $10^4$ detectors may amount to about $10^9$ for a figure.

On the other hand, in this invention, types of elements (*a*), (*b*), (*c*), (*x*), (*y*) and (*z*) of the invariables and variable quantities are the order of ten and the number of occurrence of them in one figure will be $10^2$ at the most, and total kinds of matrix for one figure may be about $10^3$ at the maximum. Moreover, it is rather rare case in which all of said elements (*a*) through (*z*) inclusive must be detected in one figure. The particular condition, for instance, there appear numerals only, they can generally be easily detected by detecting only a few of these elements.

Summarizing the above, according to this invention, figures are identified by detecting the elements of the quasi-invariables and of the variable quantities of figures by using any one of various scanning systems, subjecting signals obtained thereby to memory, integrating, differentiating and the like operations to detect sequence of occurrence of said elements, searching appropriate set value which is coincident with the measured result of the figure under detection out of a plurality of set values already stored by means of a conventional sorting device and causing said selected set value to correspond to the measured value of the figure. Accordingly, this invention makes it possible to correctly recognize figures irrespective to the magnitude, inclination, position and the ratio between longitudinal and transversal dimensions of the figure. Moreover there is such advantage that the number of the set values to be stored is greatly reduced.

While the invention has been explained by describing particular embodiments thereof, it will be apparent that improvements and modifications may be made without departing from the scope of the invention as defined in the appended claims.

What is claimed is:

1. A system for recognition of symbols of communication, said symbols consisting of line elements, by detecting as first, second and third factors, the initiation and termination, concavity and convexity, and the diversion and conversion of said line elements, while detecting as fourth, fifth and sixth factors, relative magnitude of said first three factors, inclination of line elements and relative distribution of length, boldface and position of line elements, comparing said six factors with stored information and identifying the symbols therefrom, said system comprising in combination, scanning means for sequentially scanning a field of view in which the symbols are located;

a first factor determination circuit including, increment determination means, a scanner connected to the increment determination means, logic means receiving inputs from a memory and scanner detecting initiation and termination, and, first totalizing means to obtain the total thereof;

a second factor determination circuit, including, differentiating means, and first comparison means connected to the differentiating means comparing the output thereof with preset values to determine the presence and absence of concavity and convexity and distinguishing between them;

a third factor determination circuit including pulse giving means connected to the scanning means, second totalizing means totalizing diversions and conversions, subtracting means connected to the pulse giving means and receiving inputs from said first and second totalizing means;

a first matrix memory connected to the logic means, first comparison means and subtracting means of said first, second and third factor determination circuits;

a fourth factor determination circuit including first switching and first integrating means connected to said scanning means, and second comparison means with a preset value therein connected to said first switching and first integrating means;

a fifth factor determination circuit including third comparison means with a preset value therein connected to the differentiating means of said second factor determination circuit;

a sixth factor determination circuit including second switching means connected to the scanner of the first factor determination means, fourth comparison means connected to the differentiating means of said second factor determination means and to the second switching means, acting each time a first, second and third factor occurs, a plurality of second integrating means connected to said fourth comparison means and said second switching means and fifth comparison means connected to the second integrating means;

a second matrix memory connected to said second, third and fifth comparison means;

coupled comparison means connected to the outputs of the first and second matrix memories, stored memories connected to each of said coupled comparison means to identify the outputs in each matrix memory with prestored information and an output from said coupled comparison means.

2. A system for recognition of symbols of communication, said symbols consisting of line elements, by detecting as first, second and third factors, the initiation and termination, concavity and convexity, and the diversion and conversion of said line elements, while detecting as fourth, fifth and sixth factors, relative magnitude of said first three factors, inclination of line elements and relative distribution of length, boldface and position of line elements, comparing said six factors with stored information and identifying the symbols therefrom, said system comprising in combination, scanning means for sequentially scanning a field of view in which the symbols are located;

a first factor determination circuit including, a memory connected to the scanning means, increment means for differentiating the output thereof, a scanner connected to the increment means, logic means receiving inputs from a memory and scanner to detect initiation and termination, and, first totalizing means to obtain the total thereof;

a second factor determination circuit, including, phase sensitive means connected to the scanning means, digital to analog converter means connected to the phase sensitive means, a plurality of differentiating means connected to the converter means and a plurality of first comparison means connected to the differentiating means comparing the output thereof with preset values to determine the presence and absence of concavity and convexity and distinguishing between them;

a third factor determination circuit including pulse giving means connected to the scanning means, second totalizing means totalizing diversions and conversions, subtracting means connected to the pulse giving means and receiving inputs from said first and second totalizing means;

a first matrix memory connected to the logic means, first comparison means and subtracting means of said first, second and third factor determination circuits;

a fourth factor determination circuit including first switching and first integrating means connected to said scanning means and second comparison means with a preset value therein connected to said first switching and first integrating means;

a fifth factor determination circuit including third comparison means with a preset value therein connected to the differentiating means of said second factor determination circuit;

a sixth factor determination circuit including second switching means connected to the scanner of the first factor determination means, fourth comparison means connected to the differentiating means of said second factor determination means and to the second switching means, acting each time a first, second and third factor occurs, a plurality of second integrating means connected to said fourth comparison means and said said second switching means and fifth comparison means connected to the second integrating means;

a second matrix memory connected to said second, third and fifth comparison means;

coupled comparison means connected to the outputs of the first and second matrix memories, stored memories connected to each of said coupled comparison means to identify the outputs in each matrix memory with prestored information and an output from said coupled comparison means.

References Cited by the Examiner

UNITED STATES PATENTS

| | | | |
|---|---|---|---|
| 2,877,951 | 3/1959 | Rohland | 340—146.3 |
| 2,889,535 | 6/1959 | Rochester et al. | 340—146.3 |
| 2,963,683 | 12/1960 | Demer et al. | 340—146.3 |
| 2,968,789 | 1/1961 | Weiss et al. | 340—146.3 |

MAYNARD R. WILBUR, *Primary Examiner.*

MALCOLM A. MORRISON, DARYL W. COOK, *Examiners.*

J. E. SMITH, *Assistant Examiner.*